United States Patent [19]

Lewis

[11] 4,307,391

[45] Dec. 22, 1981

[54] DESK INFORMATION DISPLAY DEVICE

[75] Inventor: Christopher M. Lewis, Newmarket, England

[73] Assignee: Pelikan Aktiengesellschaft, Hanover, Fed. Rep. of Germany

[21] Appl. No.: 60,156

[22] Filed: Jul. 24, 1979

[30] Foreign Application Priority Data

Aug. 30, 1978 [GB] United Kingdom ............... 34978/78
Apr. 12, 1979 [GB] United Kingdom ............... 13035/79

[51] Int. Cl.[3] ............................................ G06F 3/147

[52] U.S. Cl. .................................. 340/709; 340/711; 340/771; 340/792

[58] Field of Search ............... 340/711, 758, 771, 792, 340/722, 747, 754, 756, 709; 179/7.1 TP, 7 MM, 90 B, 90 BB, 90 BD, 27 FC, 175.24

[56] References Cited

U.S. PATENT DOCUMENTS

| | | | |
|---|---|---|---|
| T966005 | 1/1978 | Gillette | 179/90 B |
| 3,868,673 | 2/1975 | Mau et al. | 340/709 |
| 3,868,675 | 2/1975 | Firmin | 340/792 X |
| 3,976,995 | 8/1976 | Sebestyen | 340/711 X |
| 3,979,718 | 9/1976 | Umeda et al. | 340/771 X |
| 4,024,531 | 5/1977 | Ashby | 340/792 X |
| 4,107,663 | 8/1978 | Morimoto et al. | 340/722 |
| 4,144,524 | 3/1979 | Fleming | 340/754 |
| 4,156,238 | 5/1979 | Glasson et al. | 340/723 X |
| 4,160,242 | 7/1979 | Fowler et al. | 340/758 X |
| 4,186,279 | 1/1980 | Face | 179/90 BD |

*Primary Examiner*—David L. Trafton
*Attorney, Agent, or Firm*—Berman, Aisenberg & Platt

[57] ABSTRACT

A portable, electronic, desk-top information display device for office use in recording and selectively displaying information, comprising a keyboard the keys of which are operable to control the operation of electronic circuitry forming part of the device, and a stationary display panel on which the said electronic circuitry is adapted to produce a matrix array of illuminated dots of other discrete display items in a multiplicity of substantially equi-distant columns, with each dot being illuminated independently of all the others, so as to permit a plurality of letters, numbers or other symbols to be displayed simultaneously across the panel with the majority of such symbols having a width of at least two columns.

1 Claim, 7 Drawing Figures

DESK INFORMATION DISPLAY DEVICE

The present invention relates to desk information display devices.

Hitherto, a display panel of such a device has been constituted by a number of separate matrices of dots or other discrete display items which can be selectively illuminated so that each matrix displays a different number, letter or other symbol.

One disadvantage of this is that, if it is desired to move the symbols across the display panel, they have to jump from one matrix to the next, so that there are discontinuities in the presentation of any given symbol as it moves across the panel. Also, the space occupied by each symbol or character has to be the same when in fact the letter "I", for example, needs less space than the letter "M".

The present invention seeks to provide a remedy. To this end, the display panel comprises a long unbroken matrix with a sufficient number of columns to accommodate a number of symbols. Accordingly, the present invention is directed to a portable, electronic, desk-top information display device for office use in recording and selectively displaying information, comprising a keyboard the keys of which are operable to control the operation of electronic circuitry forming part of the device, and a stationary display panel on which the said electronic circuitry is adapted to produce a matrix array of illuminated dots or other discrete display items in a multiplicity of substantially equi-distant columns, with each dot being illuminated independently of all the others, so as to permit a plurality of letters, numbers or other symbols to be displayed simultaneously across the panel with the majority of such symbols having a width of at least two columns, the said electronic circuitry being coupled to the display panel as well as to the keys of the keyboard and being so constructed as to permit information to be fed into and stored in the device and to be selectively recalled, on operation of appropriate keys of the keyboard, in order to be displayed on the panel as symbols which are movable across the panel one column of dots at a time.

An example of a desk information display device in accordance with the present invention is illustrated in the accompanying drawings, in which.

Figure 1:
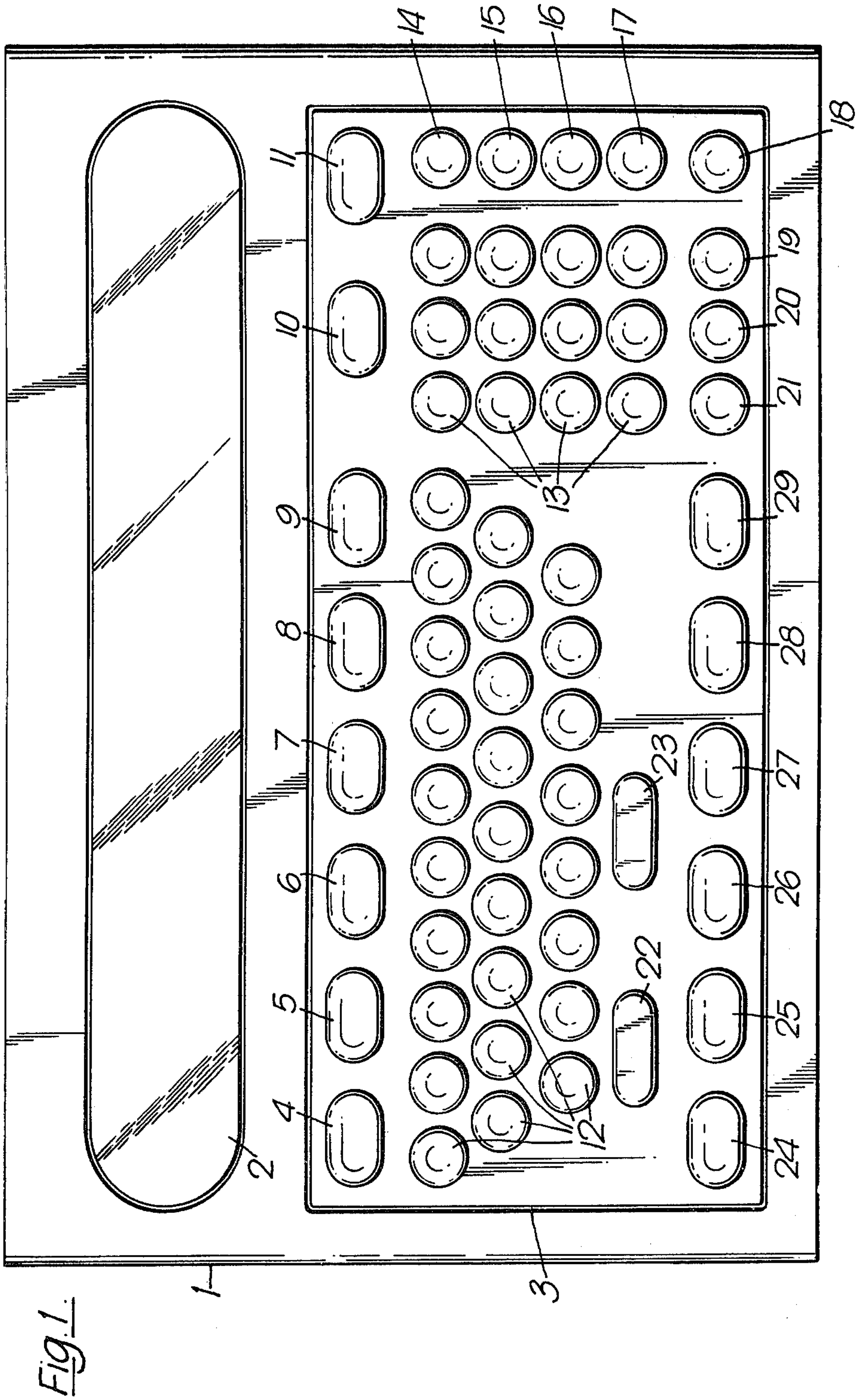
FIG. 1 is a front view of the device.

In FIG. 1, a portable, electronic, desk-top information display device for office use is shown having a casing 1 on a front of which are arranged a gas dischage display panel 2 and a keyboard 3.

The display panel 2 is so constructed that it can be activated to show a matrix array of $11\times160$ illuminated dots of substantially equi-distant columns, with each dot being illuminated independently of all the others. Although a gas discharge is used to provide illumination of a dot, this may also be performed using a light-emitting diode, or the dot may otherwise be made visually conspicuous by means of a liquid crystal. Thus discrete display items other than illuminated dots may be used to permit a plurality of letters, numbers or other symbols to be displayed simultaneously across the panel.

On the keyboard there is an array of keys each of which can be pressed to bring about the function or operation assigned to that key.

In the top row of keys, keys 4 to 10 are for determining which functional mode is to be performed by the device. The actual performance is carried out by means of electronic circuitry within the casing 1 to be described in greater detail hereinafter, the circuitry being coupled to the display panel as well as the keys of the keyboard to this end.

Thus selection of a functional mode is made by depressing one of the keys 4 to 10, the modes assigned to the different keys being as follows:

| key | mode |
|---|---|
| 4 | telephone list |
| 5 | messages |
| 6 | appointments |
| 7 | stopwatch |
| 8 | timer/alarm |
| 9 | clock |
| 10 | calculator |

Keys 13 are for the letters of the alphabet arranged in the "QWERTY" configuration standard for most typewriters. A key 23 is the space bar.

Keys 13 to 21 are for the calculator mode of operation of the device, the arrangement being similar to that found in many pocket calculators. Thus keys 13 are for the numbers 0 to 9, the three keys in the bottom row of these keys 13 being for the zero (0), for the point mark (.), and for clearing the display panel respectively. Keys 14 to 18 are for addition, subtraction, multiplication, division and result respectively. Keys 19 to 21 bring about memory recall, percentaging, and memory storage.

Finally, a number of keys are designated for certain operations of the electronic circuitry. These keys are labelled 11, 22 and 24 to 29 in FIG. 1, and depression of one of these keys causes the circuitry to perform one of the following operations:

| key | operation |
|---|---|
| 11 | cancels last character entered, |
| 22 | for automatically dialling selected phone number, |
| 24 | erases displayed information from memory, |
| 25 | allows changes to stored data, |
| 26 | allows access to protected information, |
| 27 | stops moving display, |
| 28 | for entry of new infromation, |
| 29 | proceed. |

Use of the display device will now be described in full.

Firstly, information in respect of the various modes of operation of the device is stored for subsequent recall. For example, to enter a telephone number on the electronically recorded telephone list, key 4 is depressed. The subscriber's name is then spelt out using the alphabet keys 12, the name thereby appearing on the display panel. Entry key 28 is then depressed, followed by proceed key 29, to store the name in the device's circuitry.

For storage of information under the appointments mode, appointments key 6 is pressed. In this mode the device acts as an electronic desk diary. The date of interest is spelt out on the aplhanumeric keys, and then proceed key 29 is pressed. This automatically divides the display panel matrix into "cursor off" areas, being the first 24 columns and the last 40 columns, and a "cursor on" area between the two "cursor off" areas. In the "cursor off" areas, letters and numbers are each represented by an array of illuminated dots within the matrix, the array being seven rows high, and between two columns wide (for the number "1") and five columns wide (for most of the letters and numbers). The left-hand "cursor off" area shows the date, and the right-hand "cursor-off" area shows the time at which a cursor in the "cursor on" area is set. In the "cursor on" area, the top 5 rows are for symbols, the next row down is unused, the next row is used to define important points in the display, the next two rows below this are reserved for a movable cursor, and the bottom two rows are used for a bar chart indicating periods of engagement. Periods of engagement can be entered by moving the cursor to a column representing the time which will be engaged. To do this, the cursor can be moved to the right by pressing the "+" key, or addition key 14, and to the left by pressing the "−" key, or subtraction key 15. The duration of the engagement is then entered, and then proceed key 29 is pressed for entry of a message which moves across the display as it is spelt out.

If it is desired to store information confidentially, access key 26 can be depressed, followed by entry of a code number, prior to use of the device. Thereafter, the information will only be available on pressing the access key 26 and tapping out the code number.

To set a time period at the end of which an alarm signal (either audio or visual) will be given, the timer/alarm key 8 is depressed followed by the entry key 28. The length of the time period is then entered using number keys.

Finally, the clock incorporated in the circuitry can be set at the correct time by actuating the clock key 9, then the entry key 28, followed by entry of the date, day and time. Depression of the proceed key 29 at the precise instant when the time displayed is the actual time ensures that the clock thereafter tells the correct time.

Once various pieces of information have been stored in this way, the device can be used to perform its various modes of operation, recalling stored information where necessary. To bring about the telephone list mode, key 4 is depressed. Then the name of the subscriber whose telephone number is required is spelt out on the alphabet keys. On depression of the proceed key 29, the required telephone number appears on the display panel. The name and number move across the panel from right to left, each illuminated dot being shifted one dot column at a time to bring this about. The fact that each letter, number or other symbol has a width of at least two columns, and in most instances five columns, and that the matrix array of dots is long and continuous (the columns being substantially equidistant), results in an uninterrupted appearance of the symbols moving steadily across the right hand side of the panel. Depression of the automatic dialling key 22 causes the circuitry in the device to feed call signals to the telephone output of the device, and if this output is connected to a telephone line it does the job normally accomplished by successive turns of the telephone dial.

Depression of the appointments key 6 brings about the appointments mode. The date of interest is then entered, and proceed key 29 depressed. Entries already made for the day then appear on the panel. Movement of the cursor onto an engaged period, followed by further depression of the proceed key 29, brings about display of further details of the engagement as a moving message in the right-hand side of the panel. The display on the left-hand side remains static, however, showing the time and duration of the engagement. An audio alarm signal, or visual alarm signal, or both will be given automatically five minutes prior to an engagement and when the engagement is due to commence.

The stop watch mode is brought about by key 7. The stop watch is started by the proceed key 29 borrowed from the calculator part of the keyboard, causing the elapse of time to be displayed thereafter on the panel. Pressing the stop key 27 stops the stop watch.

The timer/alarm mode commences on depression of the key 8, and display of the actual time continually kept by the device once its clock has been set as described hereinbefore is brought about by the key 9. The local time in any other part of the world can be ascertained by spelling out the city concerned and pressing the proceed key 29.

Figure 2:
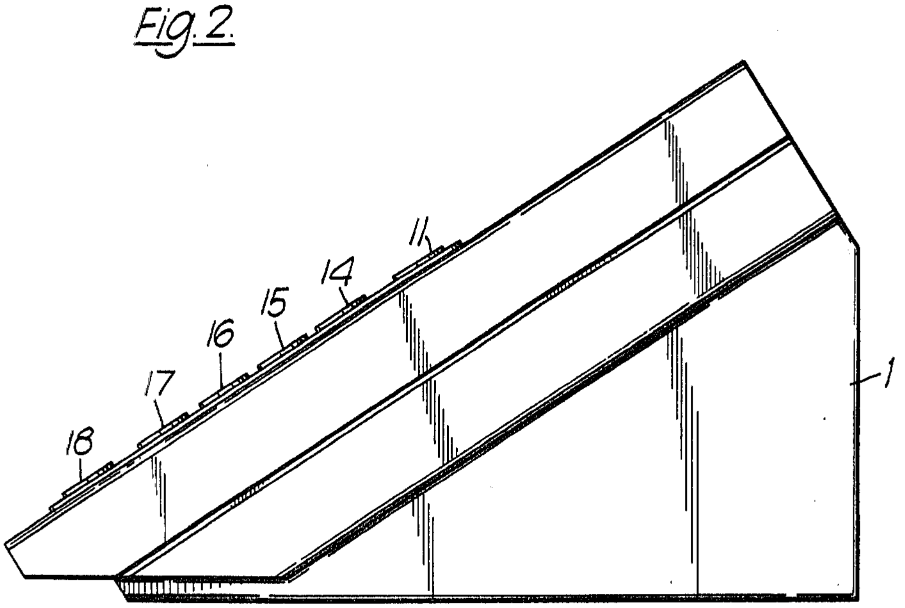
FIG. 2 is a side view of the device.
Figure 3:
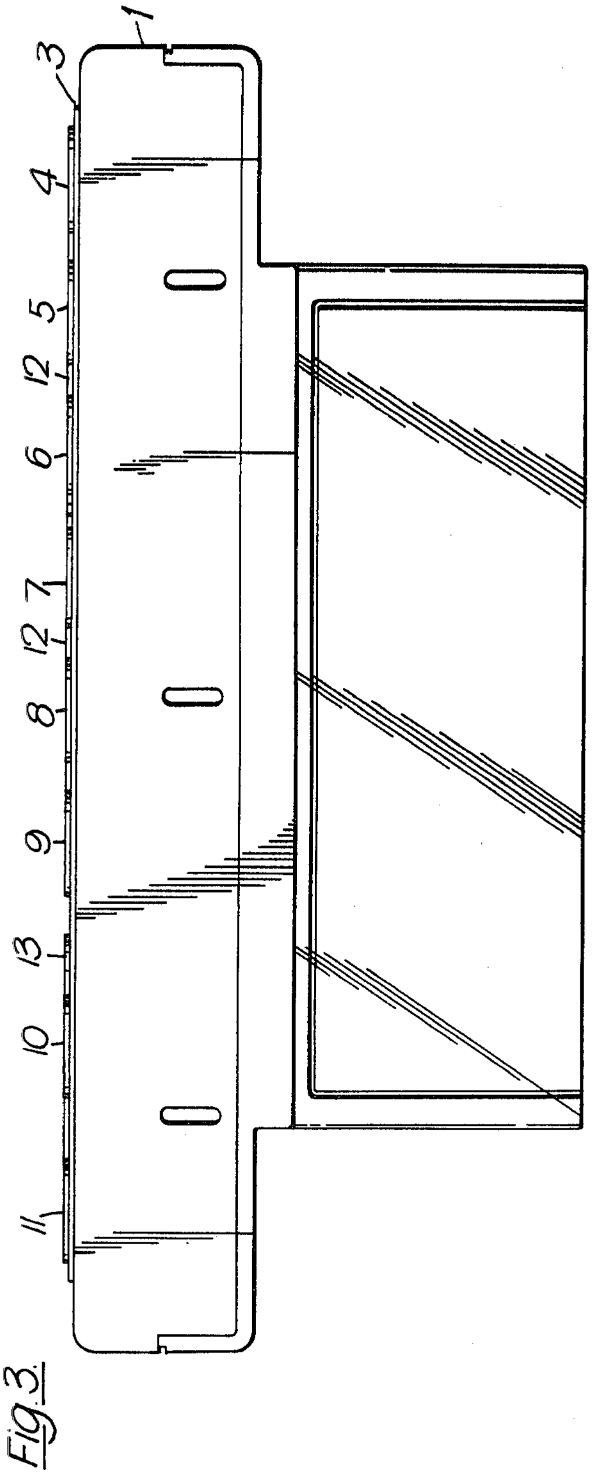
FIG. 3 is a view from above and to the rear of the device.
Figure 4:
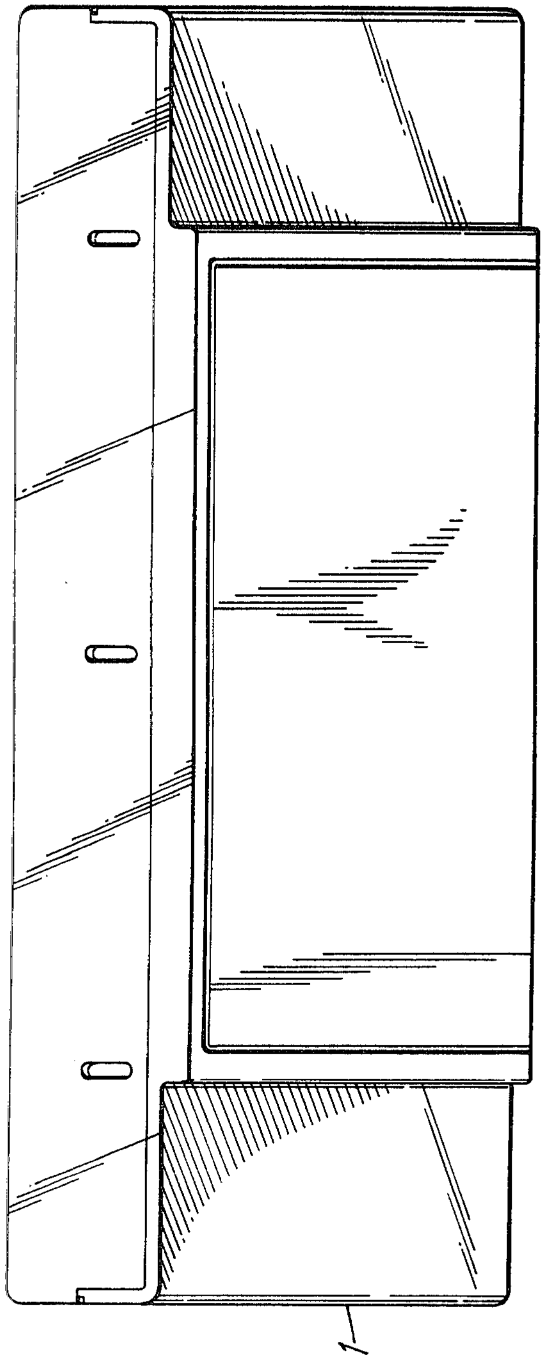
FIG. 4 is a rear view of the device.

The shape of the casing 1 can be seen from FIGS. 2 to 4.

Figure 5:
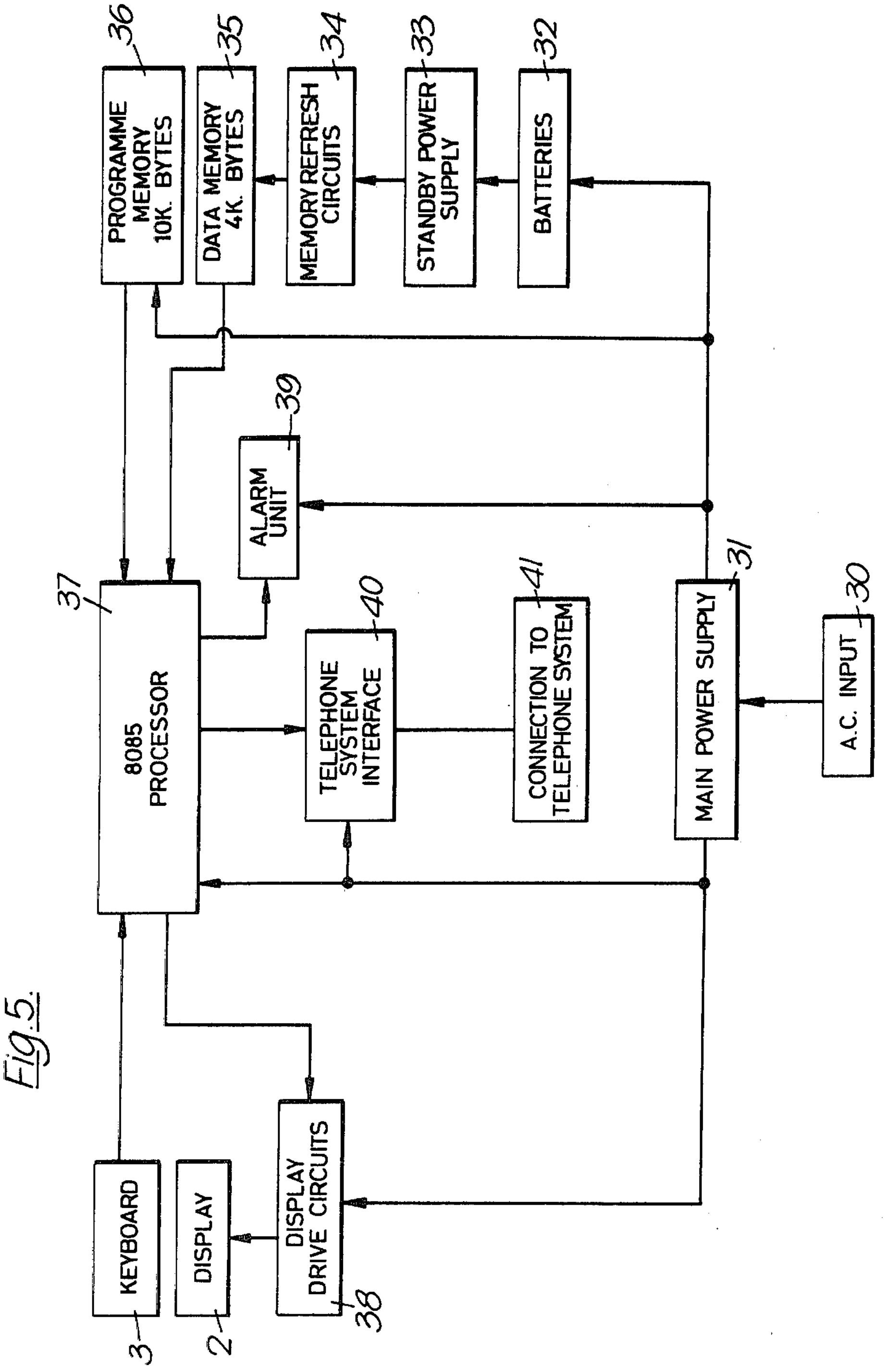
FIG. 5 is a block diagram of electrical circuitry within the device.

FIG. 5 shows the electronic circuitry of the device which is coupled to the display panel and the keys of the keyboard to bring about the various modes of operation. An A.C. input 30, for example a mains supply, is connected to a main power supply 31 incorporating a step-down transformer and a rectifier and connected to feed display drive circuits 38, an Intel 8085 microprocessor 37 and alarm unit 39, a telephone system interface 40, a 10K bytes mask programmable read only program memory 36 and nickel-cadmium rechargeable support batteries 32. Memory refresh circuits 34 maintain the storage of information in a 4K bytes data memory 35 and are powered by the main supply 31 via batteries 32 and standby power supply 33 switched into play automatically in the event of mains failure. Memory 35 uses dynamic N-MOS random access memory.

The keyboard 3 is connected to inputs of the processor 37, as are the two memories 35 and 36. Outputs from the processors are connected to govern the display drive circuits 38, the telephone system interface 40 and the alarm unit 39. The telephone system interface 40 is connected to a telephone line via the connection 41.

Most of the details of circuitry as shown in FIG. 5 could be readily supplied by a person versed in the art of electronics now that the principles of operation of the device have been described herein. However, one feature of the gas discharge display will be described here in greater detail.

Figure 6:
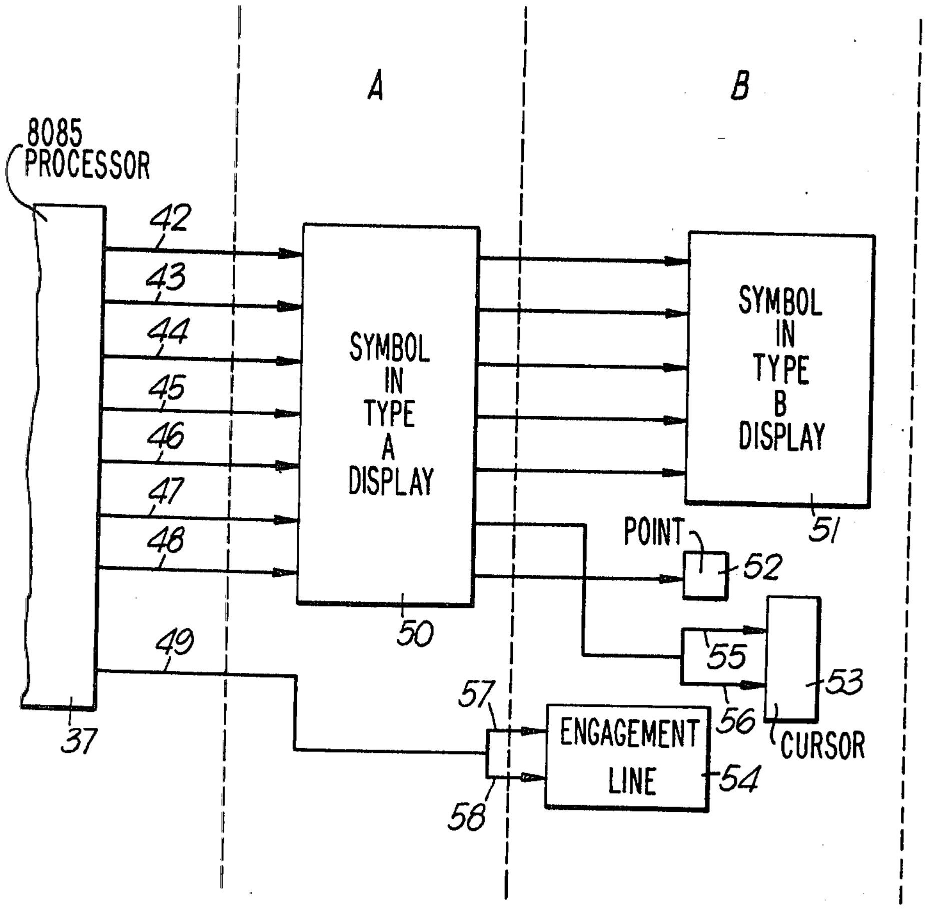
FIG. 6 is an explanatory diagram showing how part of the circuitry operates.

FIG. 6 shows this feature. In one type of display on the panel, shown in Section "A" of FIG. 6 and as used in the "cursor off" area of the panel during the appointments mode of operation, outputs 42 to 48 from processor 37 are used, via the display drive circuits 38 (not shown in FIG. 6) to illuminate dots in the top seven rows of the display matrix, to give symbols seven rows high. One such symbol is represented by a box 50. In type A display, characters or symbols are seven rows high, the spacing between symbols is one column, and that between words is four columns.

The matrix is scanned by means of the drive circuits 38 so that successive columns are illuminated in quick succession, but the scans follow one another so rapidly that persistence of vision makes all illuminated dots appear to be switched on continuously.

In the "cursor on" area of the panel, the top five rows are used for symbols like the one represented by box 51 in section "B" of FIG. 6, the next row down is left blank, the next is used to define some important point or points in time, 52, the next two rows are used for the movable cursor 53, and the bottom two rows for illustrating an engagement period 54. In type B display, characters or symbols are five rows high, spacing between symbols is one column and that between words is three columns.

The Intel 8085 microprocessor has eight output lines available for the display. The output 49 which was unused in the type A display can clearly be used to mark the engaged periods 54, but this would seem to use up all the outputs, the presence of the cursor 53 requiring a ninth output. However, the output 47, which is not required for the sixth row from the top since this is always blank in type B display, is electronically rerouted by the display drive circuits 38 or the processor 37 to bring about illumination of dots in the eighth and ninth rows from the top for the cursor 53. Thus output 47 feeds inputs 55 and 56 to the display, and output 49 feeds inputs 57 and 58, in type B display.

Figure 7:
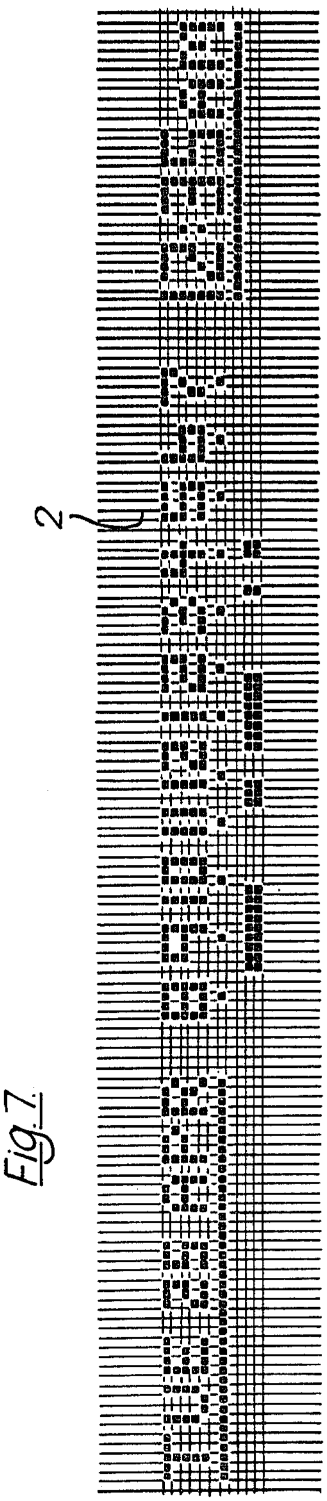
FIG. 7 shows a display on a display panel of the device.

FIG. 7 shows a display which might be presented on the display panel 2.

Assistance in the use of the device is given by the circuitry automatically causing display of the next step to be taken by the operator. For example, on pressing the telephone key 4, the question "SUBSCRIBER?" will appear on the display.

What is claimed is:

1. A portable, electronic, desk-top information display device wherein symbols are displayed on a display panel and shifted across the panel one column at a time, so that each shift is only a fraction of the width of a character to obtain an uninterrupted appearance of the symbols moving steadily across the panel from right to left, for office use in recording, storing and selectively recalling and displaying information, comprising:

(a) a keyboard;

(b) selectively operable keys of said keyboard at least some of which are respectively associated with different characters of a written language;

(c) electronic circuitry connected to said keys;

(d) memory means of said electronic circuitry connected to receive information fed into said device by operation of selected ones of said keys and to make that information available for recall on further operation of appropriate keys of said keyboard;

(e) a stationary display panel;

(f) an elongate unbroken matrix array of discrete display items of said stationary display panel connected to said electronic circuitry, said display items each being illuminable independently of all the others in dependence upon signals received by the display items from said electronic circuitry, said matrix array having a sufficient number of columns to allow a multiplicity of different characters to be simultaneously displayed across said panel with each character having a width of at least two columns, the spacing between one of said number of columns and an immediately adjacent column being the same as that between any other one of said number of columns and an immediately adjacent column thereto, so that all the columns of said number are equidistant;

(g) a plurality of display control output lines of said electronic circuitry which, in a first mode of operation of said circuitry, are connected to control switching on of discrete display items in a plurality of successive rows of said matrix, each of said rows being controlled by a respective one of said output lines, the number of the successive rows being the height of a symbol as displayed in this mode of operation;

(h) switching means in said electronic circuitry connected to change the operation of said circuitry to a second mode in which a selected number of said plurality of output lines continue to be connected to address the same successive rows as they do in the first mode, the height of a symbol as displayed in this mode being less than in the first mode, at least one more of said plurality of output lines is connected to control switching on of discrete display items in the same rows as in the first mode to define important points where desired, that row being spaced from the successive rows which are controlled by said selected number of output lines by a row which is unused in the second mode, and the output line which in the first mode controls the row which is unused in the second mode is rerouted to switch on at least one display item in a particular column and in at least one further row of said matrix beyond the said plurality of successive rows to give the image of a cursor, at least some of the symbols in this second mode of operation being static and said cursor being movable in relation to those symbols; and (i) entry and recall means of said keyboard operable to enter information in said memory means corresponding to the position of said cursor, and subsequently to recall that information when said cursor is set at that position.

* * * * *